(12) United States Patent
Paul et al.

(10) Patent No.: US 8,588,106 B2
(45) Date of Patent: Nov. 19, 2013

(54) TIME OF DAY RULE SCHEDULER

(75) Inventors: James Paul, Kanata (CA); Kevin Cutler, Carp (CA); Hamdy Farid, Kanata (CA)

(73) Assignee: Alcatel Lucent, Paris (FR)

( * ) Notice: Subject to any disclaimer, the term of this patent is extended or adjusted under 35 U.S.C. 154(b) by 205 days.

(21) Appl. No.: 13/087,499

(22) Filed: Apr. 15, 2011

(65) Prior Publication Data

US 2012/0263074 A1  Oct. 18, 2012

(51) Int. Cl.
*H04L 12/28* (2006.01)
*H04B 7/00* (2006.01)
*H04W 4/00* (2009.01)

(52) U.S. Cl.
USPC ............ 370/254; 370/310; 370/328; 709/227

(58) Field of Classification Search
USPC .......... 370/252–256, 328–398; 455/450–466; 709/206–229
See application file for complete search history.

(56) References Cited

U.S. PATENT DOCUMENTS

| | | | |
|---|---|---|---|
| 2011/0067085 A1* | 3/2011 | Brouard et al. | 726/1 |
| 2011/0302458 A1* | 12/2011 | Pandya et al. | 714/49 |
| 2011/0320323 A1* | 12/2011 | Cuervo | 705/30 |
| 2011/0320544 A1* | 12/2011 | Yee et al. | 709/206 |
| 2011/0320584 A1* | 12/2011 | Siddam et al. | 709/224 |
| 2012/0059944 A1* | 3/2012 | Fernandez Alonso et al. | 709/228 |
| 2012/0117220 A1* | 5/2012 | Mariblanca Nieves | 709/223 |
| 2012/0117235 A1* | 5/2012 | Castro Castro et al. | 709/224 |
| 2012/0144049 A1* | 6/2012 | Lopez Nieto et al. | 709/228 |
| 2012/0224538 A1* | 9/2012 | Stenfelt et al. | 370/328 |
| 2012/0233337 A1* | 9/2012 | Zhou et al. | 709/227 |
| 2012/0297074 A1* | 11/2012 | Mo et al. | 709/227 |
| 2012/0314632 A1* | 12/2012 | Martinez De La Cruz et al. | 370/310 |

* cited by examiner

*Primary Examiner* — Man Phan
(74) *Attorney, Agent, or Firm* — Kramer & Amado, P.C.

(57) ABSTRACT

Various exemplary embodiments relate to a method performed by a policy and charging rules node (PCRN) for scheduling the operation of the PCRN, the method including: selecting a type of PCRN action to carry out; determining an update time; determining an applicable PCRN action based upon the update time and a timeframe associated with the applicable PCRN action; and performing the applicable PCRN action.

16 Claims, 6 Drawing Sheets

TIME OF DAY RULE SCHEDULER

TECHNICAL FIELD

Various exemplary embodiments disclosed herein relate generally to using a time of day scheduler for policy and charging rules node actions in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the establishment of an application session by the EPC upon receipt of an application request from an application function (AF) in the form of an AA-Request (AAR) message or from a packet data network gateway (PGW) in the form of a Credit Control Request (CCR) message. The standards specify that the PCRF is responsible for receiving new application requests, creating new policy and charging control (PCC) rules commensurate with such requests, and providing these new PCC rules to the PCEF for installation. The 3GPP standards also define the format of application request messages and PCC rules.

According to the 3GPP standards, activation and deactivation times can be used to determine when a PCC rule is active and when the PCC rule is inactive. However, different versions of the relevant specification may be in use by different PGWs in an LTE network and these versions may specify different behavior with regard to PCC rule activation/deactivation times and how such times are specified. Furthermore, some of the related time dependent behavior could be optional. Due to the variations in behavior resulting from these differences and/or optional behavior, it is difficult for a PCRF node (PCRN) to support PCC rule activation and deactivation with multiple PGWs. Other PCRN actions may also depend on the time of day.

SUMMARY

In view of the foregoing, it would be desirable to provide a method for providing time of day PCRN action scheduling in the LTE system. In particular, it would be desirable to provide a PCRN that may flexibly schedule actions according to a time of day schedule.

In light of the present need for a method for dynamically scheduling rule application, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate a method performed by a policy and charging rules node (PCRN) for scheduling the operation of the PCRN, the method including: selecting a type of PCRN action to carry out; determining an update time; determining an applicable PCRN action based upon the update time and a timeframe associated with the applicable PCRN action; and performing the applicable PCRN action.

A further exemplary embodiment relates to a policy and charging rules node (PCRN) for scheduling the performance of PCRN actions, the PCRN comprising: an action storage unit; a PCRN action data set stored on the storage unit; and a time of day scheduler that determines an applicable PCRN action based upon an update time, a timeframe associated with the applicable PCRN action, and PCRN action data set stored on the action storage unit.

A further exemplary embodiment relates to a machine-readable storage medium encoded with instructions for scheduling the application of policy and charging rules node (PCRN) rules, the machine-readable storage medium including: instructions for selecting a type of PCRN action to carry out; instructions for determining an update time; instructions for determining an applicable PCRN action based upon the update time and a timeframe associated with the applicable PCRN action; and instructions for performing the applicable PCRN action.

BRIEF DESCRIPTION OF THE DRAWINGS

In order to better understand various exemplary embodiments, reference is made to the accompanying drawings, wherein.

DETAILED DESCRIPTION

Figure 1:
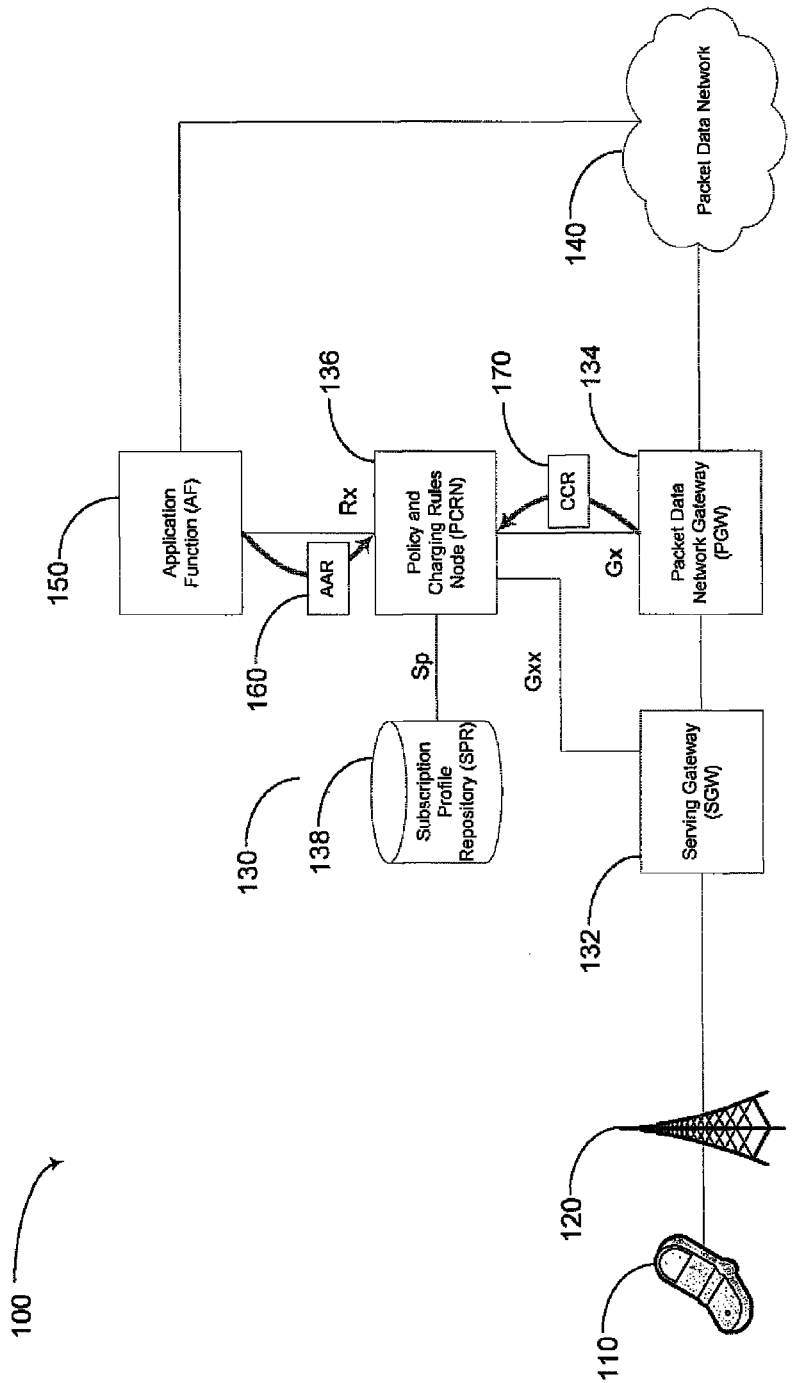
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. As will be described in further detail below with respect to FIG. 4, upon receiving a request for an unknown application service from UE 110, PGW may construct a credit control request (CCR), such as CCR 170, requesting an appropriate allocation of resources and forward the request to PCRN 136.

Policy and charging rules node (PCRN) 136 may be a device that receives requests for application services, generates PCC rules, and provides PCC rules to the PGW 134 and/or other PCENs (not shown). PCRN 136 may be in communication with AF 150 via an Rx interface. As described in further detail below with respect to AF 150 and FIG. 3, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. As described in further detail below with respect to FIG. 4, PCRN 136 may receive an application request in the form of a credit control request (CCR) 170 from SGW 132 or PGW 134. As with AAR 160, upon receipt of CCR 170, PCRN may generate at least one new PCC rule for fulfilling the application request 170. In various embodiments, AAR 160 and CCR 170 may represent two independent application requests to be processed separately, while in other embodiments, AAR 160 and CCR 170 may carry information regarding a single application request and PCRN 136 may create at least one PCC rule based on the combination of AAR 160 and CCR 170. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. As will be described in further detail with reference to FIG. 6, data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an AA-Request (AAR) 160 according to the Diameter protocol, to notify the PCRN 136 that resources should be allocated for the application service. This application request message may include information such as an identification of the subscriber using the application service and an identification of the particular service data flows that must be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-6.

According to various exemplary embodiments, user equipment 110 may communicate with AF 150 to indicate that user equipment 110 wishes to receive a known service provided by AF 150. Such communication may occur via EPC 130 and packet data network 140 or via other communications channels (not shown). AF 150 may then construct an AAR 160 indicating the subscriber and the data flows necessary to provide the requested service. AF 150 may then forward the AAR 160 to the PCRN 136 via the Rx interface. Upon receipt of the AAR 160, PCRN 136 may generate a PCC rule for each flow indicated by the AAR 160 as necessary to providing the requested service. When generating each PCC rule, PCRN 136 may also take other information into account, such as subscriber data from SPR 138 and internally generated policy decisions. PCRN 136 may then transmit each new PCC rule to PGW 134 via the Gx interface for installation. After installation of the new PCC rules, PGW 134 may then allow data communication for each of the requested data flows while appropriately charging the subscriber and ensuring that a particular QoS is met.

In various embodiments, such as those including a PMIP deployment, SGW 132 may be at least partially responsible for ensuring that the necessary QoS is met. In such cases, PCRN 136 may also generate a matching QoS rule for each new PCC rule. PCRN 136 may then provide each new QoS rule to SDW 132 via the Gxx interface for installation.

It should be noted that, while the above example describes a network-initiated application request in the form of an AAR 160, the methods and devices described herein are also capable of responding to a UE-initiated application request in the form of a CCR 170.

PRCN 136 uses rules to control and configure services provided to a subscriber. The scope of these services is often defined by subscriber agreements. Such subscriber agreements will often define different timeframes having an associated cost or other limits on the service. Therefore, time of day scheduling for rules is needed in order to enforce the subscriber agreements. The following is a description of embodiments to implement time of day scheduling for rules.

Figure 2:
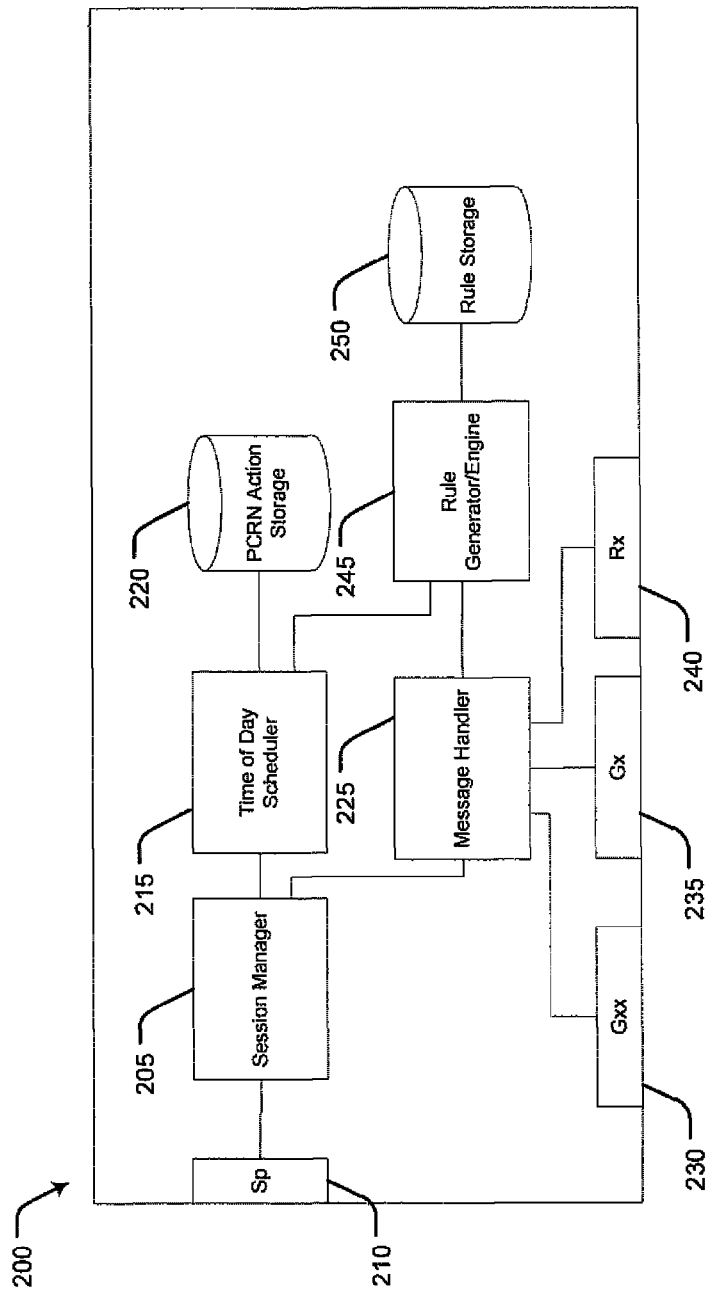
FIG. 2 illustrates an exemplary policy and charging rules node (PCRN) for creating new policy and charging control (PCC) rules in response to application requests.

FIG. 2 illustrates an exemplary policy and charging rules node (PCRN) 200 for creating new policy and charging control (PCC) rules in response to application requests. PCRN 200 may correspond to PCRN 136 of exemplary subscriber network 100. PCRN 200 may include session manager 205, Sp interface 210, time of day scheduler 215, action storage 220, message handler 225, Gxx interface 230, IP-CAN and Gx interface 235, an Rx interface 240, a rule generator/engine 245, and rule storage 250.

Session manager 205 may include hardware and/or executable instructions encoded on a machine-readable storage medium configured to establish and manage communications sessions. Session manager 205 may receive IP-CAN session establishment requests from PGW 134 and Gx interface 235. GW control session requests from SGW 132 may arrive at session manager 205 via Gxx interface 230. Session manager 205 may receive AF session requests from ANs such as AN 150. Session manager 205 may manage sessions by updating information in session data storage and communicating changes in the session to the appropriate network elements via Gxx interface 230, Gx interface 235, and Rx interface 240.

Sp interface 210 may be an interface comprising hardware and/or executable instructions encoded on a machine-readable storage medium configured to communicate with a SPR such as SPR 138. Thus, Sp interface 210 may transmit record requests and receive subscription profile records.

The time of day scheduler 215 may include hardware and/or executable instructions on a machine readable storage medium configured to schedule various PCRN actions. Certain PCRN actions may be scheduled to be taken at various times as needed. The time of day scheduler 215 may maintain this schedule and may cause the proper actions to take place based upon the time of day. The time of day scheduler 215 may periodically determine if any actions need to be taken based upon the current time of day. As a result various actions taken by the PCRN may vary depending on the time of day.

PCRN action storage 220 may be any machine-readable medium capable of storing PCRN action data sets. Accordingly, PCRN action storage 220 may include a machine-readable storage medium such as read-only memory (ROM), random-access memory (RAM), magnetic disk storage media, optical storage media, flash-memory devices, and/or similar storage media.

Message handler 225 may include hardware and/or executable instructions on a machine-readable storage medium configured to handle PCC rule messages between the session manager 205 and the Gxx interface 230, the Gx interface 235, and the Rx interface 240. As will be described further below, the message handler buffers PCC rule messages so that the rate that the PCC rule messages are transmitted may be controlled.

The message handler 225 may also include a gateway control session manager to generate and transmit QoS rules for installation at an SGW. In various embodiments utilizing gateway control sessions to provide QoS assurance, such as an embodiment utilizing PMIP, gateway control session manager may extract information necessary to generate a QoS rule from a PCC rule. For example, gateway control session manager may extract the rule name, service data flow filter, and QoS parameters from a PCC rule and generate a new QoS rule. Gateway control session manager may then forward the new QoS rule to an SGW or other appropriate node via Gxx interface 230.

The message handler 225 may further include an IP-CAN session manager to transmit a new PCC rule to a PGW implementing a PCEF. IP-CAN session manager may receive a new PCC rule and immediately forward it to a PGW or other node via Gx interface 235. IP-CAN session manager may perform additional functionality such as, for example, receiving requests for rules via Gx interface 235 and responding by retrieving the requested rule and transmitting it via the Gx interface 235.

Gxx interface 230 may be an interface comprising hardware and/or executable instructions encoded on a machine-readable storage medium configured to communicate with a SGW such as SGW 132. Such communication may be implemented according to the 3GPP TS 29.212. Thus, Gxx interface 230 may receive requests for QoS rules and transmit QoS rules for installation. Gxx interface 230 may further receive UE-originated application requests in the form of a CCR.

Gx interface 235 may be an interface comprising hardware and/or executable instructions encoded on a machine-readable storage medium configured to communicate with a PGW such as PGW 134. Such communication may be implemented according to the 3GPP TS 29.212. Thus, Gx interface 235 may receive requests for PCC rules and transmit PCC rules for installation. Gx interface 235 may further receive UE-originated application requests in the form of a CCR, such as CCR 170.

Rx interface 240 may be an interface comprising hardware and/or executable instructions encoded on a machine-readable storage medium configured to communicate with an AF such as AF 150. Such communication may be implemented according to the 3GPP TS 29.214. Specifically, Rx interface 240 may receive an application request (AAR) from AF 150.

PCC rule generator/engine 245 may include hardware and/or executable instructions on a machine-readable storage medium configured to generate a new PCC rule based on a received application request and/or a service flow object from the time of day scheduler 215. Rule generator/engine 245 may first generate a new PCC rule object. Next, rule generator/engine 245 may insert data into the PCC rule object, including information ascertained from the AAR, CCR, and/or service flow object such as, for example, time of day scheduling information, bandwidth, flow status, and/or flow descriptors. The rule generator/engine 245 may next forward the PCC rule to message handler 220 for installation. Rule generator/engine 245 also manages and applies rules that control the operation of the PCRN 200. These rules are stored in rule storage 250. Rule storage 250 may be any machine-readable medium capable of storing rules generated by the rules engine 245. Accordingly, rule storage 250 may include a machine-readable storage medium such as read-only memory (ROM), random-access memory (RAM), magnetic disk storage media, optical storage media, flash-memory devices, and/or similar storage media. The rules engine may process different types of rule sets. Examples of rule set are Gx establishment, Gx modification, Gx termination, Gxx establishment, Gxx modification, Gxx termination, Rx establishment, Rx modification, Rx termination, PCC rule creation, and QCI mapping. Other rule sets may be contemplated in order to support the operation of the PCRN 200 in providing and managing services to a subscriber based upon various configuration parameters specified by the carrier.

Rule sets may further include rule tables. The rule tables will include a list of specific rules to be applied when the rule table is selected for application by the rules engine 245. The rule table may include time of day parameters as well as priority parameters in order to allow for different rules to be applied depending upon the time of day. This will be described in further detail below with respect to FIG. 5

Figure 3:
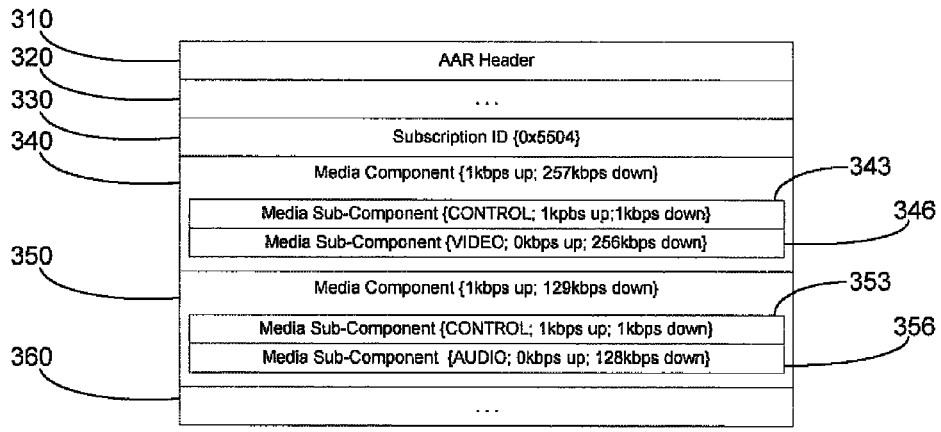
FIG. 3 illustrates an exemplary network-originated application request message.

FIG. 3 illustrates an exemplary network-originated application request message in the form of an AAR 300. AAR 300 may be constructed according to the Diameter message protocol and/or 3GPP TS 29.214. Accordingly, AAR 300 may include a header 310, subscription ID field 330, media component fields 340, 350, and a number of additional fields 320, 360. Note that the order of the fields of AAR 300 may vary. Thus, for example, subscription ID field 330 may be located after media component fields 340, 350.

Header 310 may be a standard Diameter header indicating that message 300 is an AAR. Thus, header 310 may include a command code field set to a value of 265 and the R-bit field of the command flags field set, as provided for by the Diameter protocol and 3GPP TS 29.214.

Subscription ID field 330 may be an attribute-value pair (AVP) for indicating a subscription that is associated with the particular request. For example, subscription ID field 330 indicates that the subscription identified by the value "0x5504" is associated with AAR 300. This information may be used to access a subscription profile record and charge the appropriate subscriber in relation to the requested service.

Media component fields 340, 350 may contain service information related to each media component of a requested service. In the example of AAR 300, the request may be for a streaming video. Media component 340 may correspond to the video portion of the stream while media component 350 may correspond to the audio portion of the stream. Each media component may carry further description such as, for example, the requested bandwidth for each portion of the stream. Thus, media component 340 may request 1 kbps upstream and 257 kbps downstream for the video portion while media component 350 may request 1 kbps upstream and 129 kbps downstream for the audio portion.

Media component fields 340, 350 may further include media sub-components 343, 346, 353, 356, each indicating an independent data stream necessary for providing the requested service. Thus, media sub-component 343 may indicate that a control stream having bandwidth of 1 kbps upstream and 1 kbps downstream is necessary for providing a streaming video. Likewise, media sub-component 346 may indicate that a video stream having 256 kbps downstream bandwidth is also necessary for a streaming video. Media-subcomponents 353, 356 may similarly indicate that a control stream having 1 kbps bandwidth in both directions and an audio stream having 128 kbps downstream are necessary for providing the audio component of the streaming video.

Additional fields 320, 360 may include additional information as specified by the Diameter protocol and/or 3GPP TS 29.214. Thus, additional fields 320, 360 may include additional attribute value pairs (AVPs) such as the Origin-Host AVP, Destination-Host AVP, Supported-Features AVP, Framed-IP-Address AVP, etc. Additional fields 320, 260 may be used in extracting other useful information such as, for example, flow identifying information.

Figure 4:
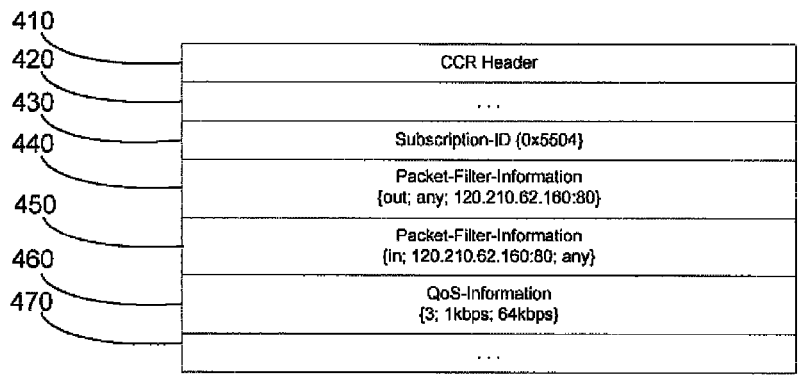
FIG. 4 illustrates an exemplary user equipment-originated application request message.

FIG. 4 illustrates an exemplary user equipment-originated application request message in the form of a CCR 400. CCR 400 may be constructed according to the Diameter message protocol and/or 3GPP TS 29.212. Accordingly, CCR 400 may include a header 410, subscription ID field 430, packet filter information fields 440, 450, QoS information field 460, and a number of additional fields 420, 470. Note that the order of the fields of CCR 400 may vary. Thus, for example, subscription ID field 430 may be located after packet filter information fields 440, 450, or QoS information field 460.

Header 410 may be a standard Diameter header indicating that message 400 is a CCR. Thus, header 410 may include a command code field set to a value of 258 and the R-bit field of the command flags field set, as provided for by the Diameter protocol and 3GPP TS 29.212.

Subscription ID field 430 may be an attribute-value pair (AVP) for indicating a subscription that is associated with the particular request. For example, subscription ID field 430 indicates that the subscription identified by the value "0x5504" is associated with CCR 400. This information may be used to access a subscription profile record and charge the appropriate subscriber in relation to the requested service.

Packet filter information fields 440, 450 may contain service information related to each requested flow for the requested service. In various embodiments, such as those implementing LTE for example, packet filter information fields 440, 450 may be Packet-Filter-Information AVPs. In various embodiments, such as those implementing GPRS for example, packet filter information fields 440, 450 may be TFP-Packet-Filter-Information AVPs. In the example of CCR 400, the request may be, for example, for HTTP server traffic. Packet filter information field 440 may describe a downstream flow, as indicated by the 'out' value, for traffic destined for IP address 120.210.62.160 on port 80 from any source. Likewise, packet filter information field 450 may describe an upstream flow, as indicated by the 'in' value, for traffic sent from IP address 120.210.62.160 on port 80 to any destination. Packet filter information fields 440, 450 may contain additional information such as, for example, a type of service, traffic class, and/or flow label.

QoS information field 460 may contain requested QoS settings for the requested service flows. For example, QoS information field 460 may indicate that the flows requested by CCR 400 should have an allocation retention priority of 3 and a maximum bandwidth of 1 kbps upstream and 64 kbps downstream. QoS information field 460 may contain additional information such as, for example, a QCI, guaranteed bandwidths, and/or a bearer identifier.

In various exemplary embodiments, PCRN 200 may not use QoS information field 460 to determine QoS values when generating a PCC rule. In such embodiments, a PGW such as PGW 134 may include QoS information within the packet filter information fields and PCRN 200 may use this information in the generation of a PCC rule instead.

Additional fields 420, 470 may include additional information as specified by the Diameter protocol and/or 3GPP TS 29.212. Thus, additional fields 420, 470 may include additional attribute value pairs (AVPs) such as the CC-Request-Type AVP, Framed-IP-Address AVP, 3GPP-SGSN-Address AVP, etc. Additional fields 420, 470 may be used in extracting other useful information such as, for example, flow identifying information.

Figure 5:
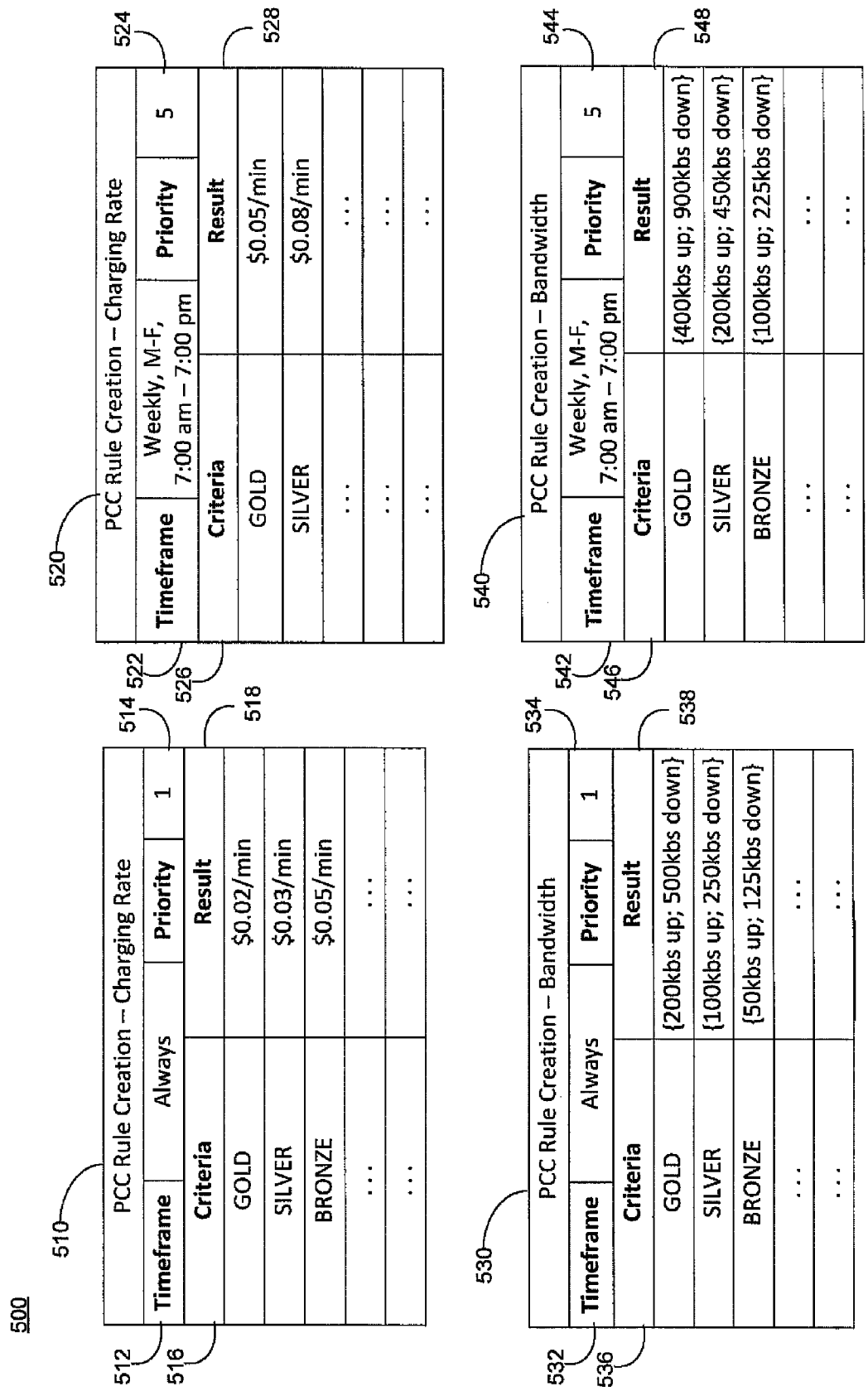
FIG. 5 illustrates an exemplary data arrangement for storing PCRN rules.

FIG. 5 illustrates an exemplary data arrangement 500 for storing PCRN rules. Data arrangement 500 may be, for example, a group of tables in a database stored in rule storage 250. Alternatively, data arrangement 500 could be a series of linked lists, an array, or a similar data structure. Thus, it should be apparent that data arrangement 500 is an abstraction of the underlying data; any data structure suitable for storage of this data may be used.

FIG. 5 specifically illustrates a PCC creation rule 500. The PCC creation rule 500 provides a specific example of how a PCRN action may be scheduled based upon time of day scheduling information. The rule includes four different tables. Illustrated are two different types of tables: charging rate and bandwidth. Charging rate tables 510, 520 illustrate the type of data that may be stored relating to charging rate. The charging rate tables 510, 520 include: a timeframe 512, 522; priority 514, 524; criteria 516; 526; and result 518, 528. The timeframe 512, 522 specifies the times when the rule is applicable. Typically, the timeframes will represent a repeating timeframe. For example, a timeframe may repeat daily, weekly, yearly, or any other desired amount of time. It is noted that a weekly period provides a great benefit for use with respect to mobile telephone services. Often, subscribers are offered subscriber packages with free nights and weekends. Hence, on Monday through Friday the time of day where free minutes are available occur at the same time. On Saturday and Sunday the whole day is free. Thus, a daily period would not work in this situation, because weekdays are different from the weekends. Further, a yearly period or any other period may be used that beneficially allows for daily variations in the applicable rules to be accommodated.

The priority 514, 524 allows for rules to have overlapping timeframes 512, 522 and the highest priority applicable rule will be applicable at a given time. Charging rate table 510 has a timeframe of always and a priority of 1. Thus, charging rate table 510 will always be applicable, but has the lowest priority of 1, so it will only be applicable if there is no other applicable charging rate table. Charging rate table 520 has a time frame of M-F, 7:00 am-7:00 pm and a priority of 5. Thus, charging rate table 520 is applicable during the specified timeframe and will be applicable if it is the highest applicable charging rate table. The criteria 516, 526 in this example specify different levels of service that result in different charging rates as table entries. For example, charging rate table 510 has multiple table entries where GOLD has a charging rate of $0.02/min, SILVER has a charging rate of $0.03/min, and BRONZE has a charging rate of $0.05/min. Charging rate table 520 specifies different results for the criteria.

Bandwidth tables 530, 540 illustrate the type of data that may be stored relating to bandwidth. Like the charging rate tables 510, 520, the bandwidth tables 530, 540 include: a timeframe 532, 542; priority 534, 544; criteria 536; 546; and result 538, 548. These bandwidth tables 530, 540 function like charging the rate tables 510, 520 described above.

Data arrangement 500 may contain numerous additional rules. Each of these rules are arranged to provide the necessary parameters to allow the PCRN to function. Each of the tables that are a part of these rules will include a timeframe that indicates when the rule is applicable. Further, the tables may include a priority parameter. The use of a priority parameter allows for the same type of rules tables to have overlapping timeframes. The overlap is resolved using the priority, by applying the higher priority applicable rule. As a result, a lowest priority rule table that is always applicable may be specified to act as a default rule table.

Figure 6:
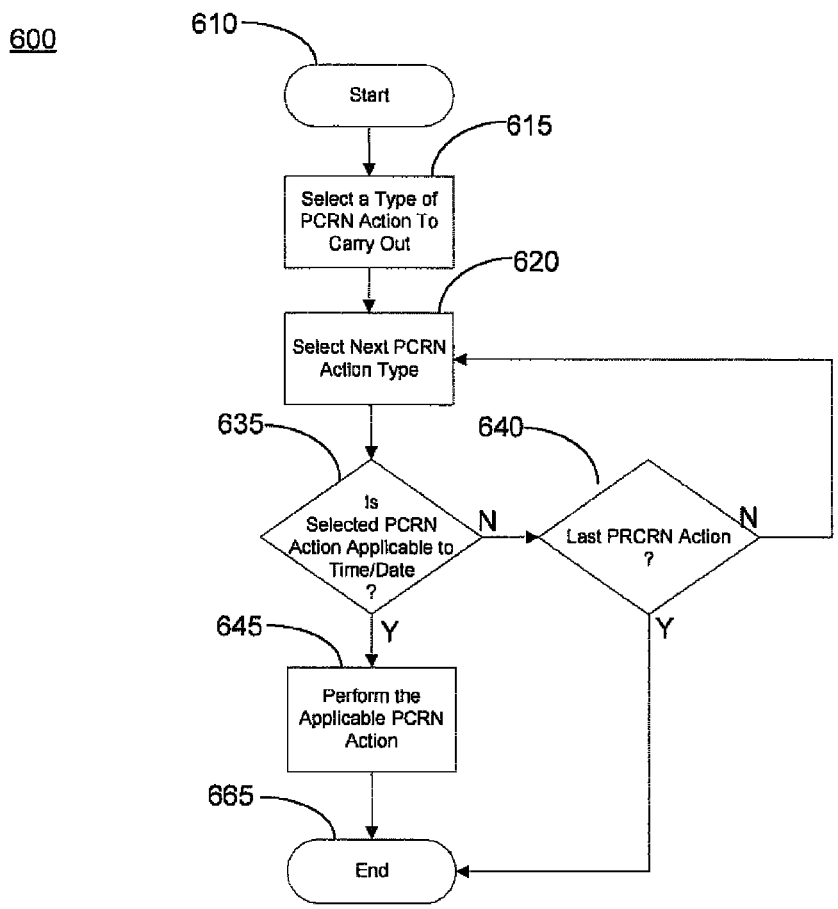
FIG. 6 illustrates an exemplary method for scheduling and applying PCRN actions based upon time PCRN rule schedules.

FIG. 6 illustrates an exemplary PCRN action scheduling method 600 for scheduling PCRN actions. The PCRN 136 may periodically perform the method 600. Further, the method 600 may be performed at any other time as needed by the PCRN, for example when there is a request for a new service or an existing session must be modified. This allows for the effective time of day scheduling for PCRN actions.

The method 600 begins by selecting a type of PCRN action to carry out 615. This may include auditing the sessions in operation, initiating new services, updating or modifying existing charging rules and parameters, etc. For time of day dependent PCRN activities, information is stored for those activities based upon a time of day when the action is applicable. Parameters, rules, or other data related to each time of day period may be stored. Such data may be stored as a table, a list, a linked list, or any other sufficient data storage method and structure. The PCRN 136 uses this data to select the next PCRN action type 620.

Next, the PCRN 136 determines if the selected PCRN action is applicable to the time and date of interest 625. The current time may be a time of interest, but it is possible to select a time in the future as the time of interest as well. If the PCRN action selected is not applicable to the time of interest, then it is determined if the PCRN action is the last PCRN action in the data 630. If so, then the method ends 640. If not, then the next highest rule table is selected 630. If the selected PCRN action is applicable 625, then the PCRN 136 performs the application PCRN action 640. Next, the method ends 640.

It should be noted that the data for the PCRN actions may be set up such that a PCRN is always applicable. This may be done by managing the time period that may be associated with each PCRN action, so that all times of day are accounted for. Another, option for organizing the data for the PCRN actions would be have default data for the action type that may always be applicable and to assign a priority to each time of day set of data. The default data may have the lowest priority and no time of day limitation to allow it to be selected when no other applicable PCRN action is applicable to the current time of day.

Figure 7:
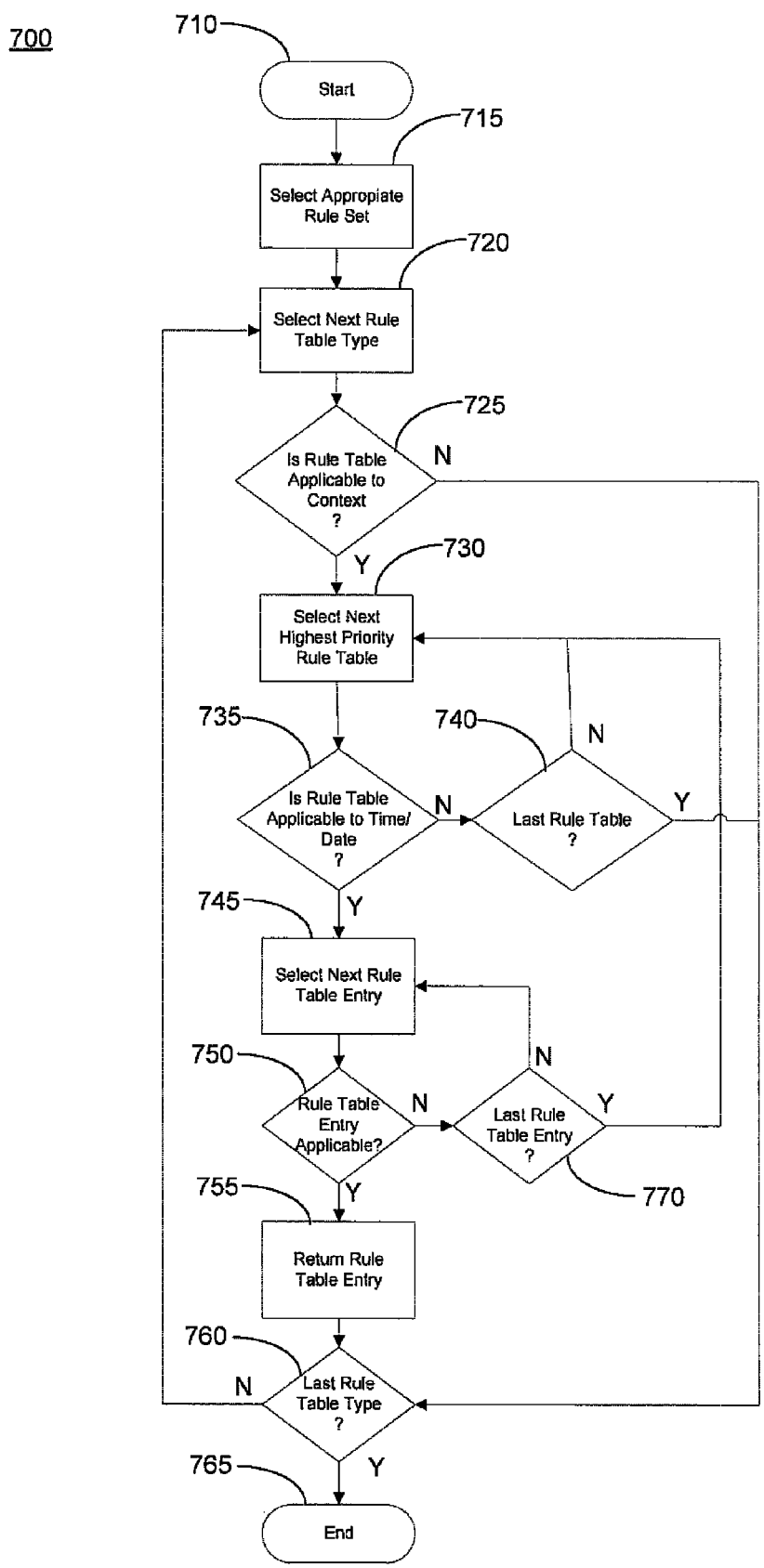
FIG. 7 illustrates an exemplary method for scheduling and applying rules based upon rule schedules.

FIG. 7 illustrates an exemplary rule scheduling method 700 for scheduling and applying rules based upon rule schedules. This embodiment provides a more specific example of how the time of day scheduler would operate with respect to rule scheduling. The rules engine 245 may periodically perform the method 700, to ensure that that the rules in force are the currently applicable rules. Further, the method 700 may be performed at any other time as needed by the rules engine 245, for example when there is a request for new service or an existing session must be modified. This allows for the effective time of day scheduling for the PCRN rules.

The method 700 begins by selecting the appropriate rule set 715. This means that the rules engine 245 determines the rule set that applies based upon the action to be taken. For example, if an IP-CAN session needs to be modified, the Gx modification rules will be used. Then, the next rule table type is selected 720. This allows for the method to step through each of the different types of rule tables that the rule set may contain. It is then determined if the selected rule table is applicable to the context selected 725. That is, the rules engine 245 determines if the selected rule table is even applicable for the action contemplated. If the rule table is not applicable to the context, then it is determined if the rule table is the last rule table 760. If so, then the method ends 765. If not, then the next rule table is selected 720.

If the rule table is applicable to the context 725, then the next highest priority rule table is selected 730. In one embodiment, the rule tables may be ordered by priority, allowing for the tables to be selected in order. In another embodiment, the rule tables may be stored in any order, and the next highest priority rule table is identified by searching through the list of rule tables. Next it is determined if the rule table selected is applicable to the time/date of interest 735. The current time may be the time of interest, but it is possible to select a time in the future as the time of interest as well. If the rule table selected is not applicable to the time of interest, then it is determined if the rule table is the last rule table 740. If so, then it is determined if this is the last rule table type 760 as before. If not, then the next highest rule table is selected 730. If the rule table selected is applicable 735, then the next rule table entry is selected 745.

Next it is determined if the rule table entry is applicable 750. If not, then it is determined if this rule table entry if the last rule table entry 770. If so, then the next highest priority rule table is selected 730. If not, then the next rule table entry is selected 745. If the rule table entry is applicable 750, then return the rule table entry 755. Next, it is determined if the current rule table type is the last rule table type. If so, then the process ends 765. If not, then the next rule table type is selected 720.

It is noted that according to the 3GPP specifications, activation and deactivation times may be used to determine when a PCC rule is active and when it is inactive. However, different versions of the relevant specification may be in use by different PGWs in the network. These versions may specify different behavior with regard to PCC rule activation/deactivation times and how such times are specified. Furthermore, some of the related time dependent behavior could be optional. Therefore, the PCRF may operate in a hybrid mode. For some PGWs under its control it will use the activation/deactivation times for PCC rules when they are supported. For other PGWs, the PCRF will use rules and associated timeframe parameters to activate and deactivate rules in accordance with subscriber parameters.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for scheduling the operation of the PCRN, the method comprising:
    selecting a type of PCRN action to carry out;
    determining an update time;
    determining an applicable PCRN action based upon the update time and a timeframe associated with the applicable PCRN action;
    performing the applicable PCRN action; and
    repeating the steps of selecting a type of PCRN action, determining an update time, determining an applicable PCRN action, and performing the applicable PCRN action at a predetermined time interval, wherein the PCRN includes a PCRN action data set that includes a set of data for a specific PCRN action type wherein each entry in the set of data includes the timeframe and a priority level.

2. The method of claim 1, wherein determining the applicable PCRN action based upon the update time comprises:
    identifying the PCRN action entry that has the highest priority level;
    if the update time is within the timeframe of the identified PCRN action entry, then the identified PCRN action entry is the applicable PCRN action, and
    if not, then identify a second PCRN action entry that has the next highest priority level, and if the update time is within the timeframe of the indentified second PCRN action entry, then the identified PCRN action entry is the applicable PCRN action entry.

3. The method of claim 1, wherein the timeframe of the PCRN action entry repeats daily.

4. The method of claim 1, wherein the timeframe of the PCRN action entry repeats weekly.

5. The method of claim 1, wherein the timeframe of the PCRN action entry repeats yearly.

6. The method of claim 2, wherein the set of data for the specific PCRN action type includes a plurality of PCC rule tables, wherein each PCC rule table includes a timeframe and a priority.

7. The method of claim 6, wherein the PCC rule table includes a plurality of PCC rule criteria and PCC rule results.

8. A non-transitory machine-readable storage medium encoded with instructions for scheduling the application of policy and charging rules node (PCRN) rules, the machine-readable storage medium comprising:
    instructions for selecting a type of PCRN action to carry out;
    instructions for determining an update time;
    instructions for determining an applicable PCRN action based upon the update time and a timeframe associated with the applicable PCRN action;
    instructions for performing the applicable PCRN action; and
    instructions for repeating the steps of selecting a type of PCRN action, determining an update time, determining an applicable PCRN action, and performing the applicable PCRN action at a predetermined time interval,
    wherein the PCRN includes a PCRN action data set that includes a set of data for a specific action type wherein each entry in the set of data includes the timeframe and a priority level.

9. The non-transitory machine-readable storage medium of claim 8, wherein instructions for determining the applicable PCRN action based upon the update time comprises:
    instructions for identifying the PCRN action entry that has the highest priority level;
    if the update time is within the timeframe of the identified PCRN action entry, then the identified PCRN action entry is the applicable PCRN action, and
    if not, then identify a second PCRN action entry that has the next highest priority level, and if the update time is within the timeframe of the indentified second PCRN action entry, then the identified PCRN action entry is the applicable PCRN action entry.

10. The non-transitory machine-readable storage medium of claim 8, the timeframe of the rule repeats daily.

11. The non-transitory machine-readable storage medium of claim 8, the timeframe of the rule repeats weekly.

12. The non-transitory machine-readable storage medium of claim 8, the timeframe of the rule repeats yearly.

13. The non-transitory machine-readable storage medium of claim 9, wherein the set of data for the specific PCRN action type includes a plurality of PCC rule tables, wherein each PCC rule table includes a timeframe and a priority.

14. The non-transitory machine-readable storage medium of claim 13, wherein the PCC rule table includes a plurality of PCC rule criteria and PCC rule results.

15. A policy and charging rules node (PCRN) for scheduling the performance of PCRN actions, the PCRN comprising:
    an action storage unit;
    a PCRN action data set stored on the storage unit; and
    a time of day scheduler that periodically determines an applicable PCRN action based upon an update time, a timeframe associated with the applicable PCRN action, and PCRN action data set stored on the action storage unit,
    wherein the PCRN action data set comprises a set of data for a specific PCRN action type
    wherein each entry in the set of data includes the timeframe and a priority level.

16. The PCRN of claim 15, the timeframe of the PCC rule repeats one of daily, weekly, and yearly.

* * * * *